(No Model.)
G. W. LORD.
MECHANICAL TELEPHONE LINE HANGER.
No. 361,302. Patented Apr. 19, 1887.
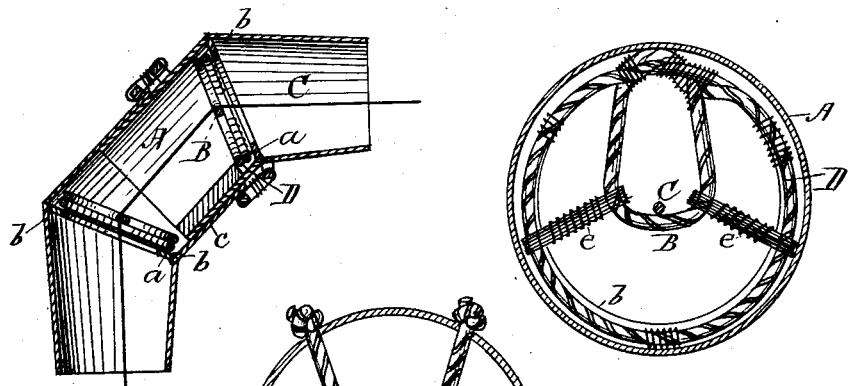
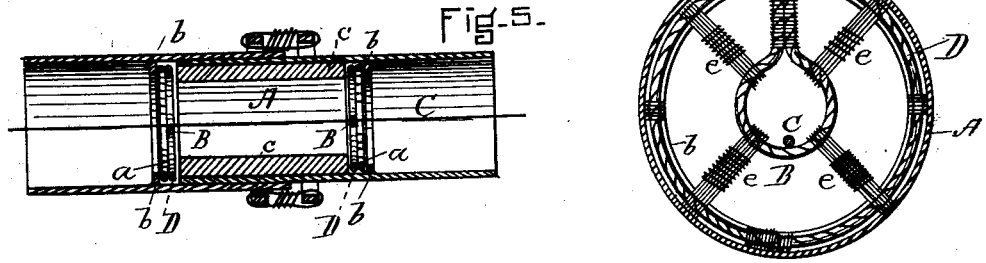
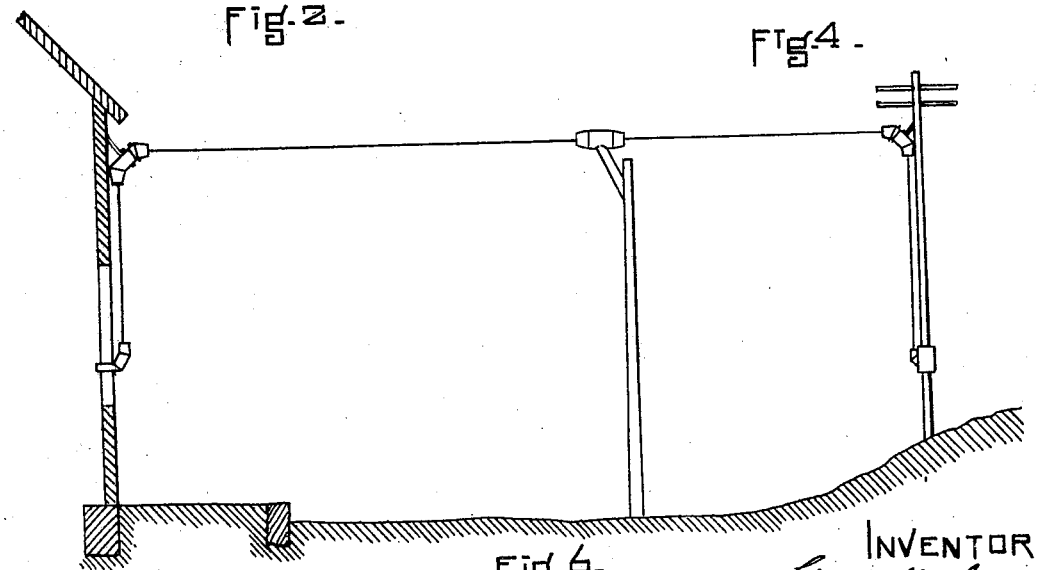
WITNESSES
Frank L. Parker
Matthew McClint
INVENTOR
George W. Lord
by his attorney
Alg. L. Hayes

UNITED STATES PATENT OFFICE.

GEORGE W. LORD, OF BOSTON, MASSACHUSETTS, ASSIGNOR, BY MESNE ASSIGNMENTS, TO THE LORD ACOUSTIC TELEPHONE MANUFACTURING COMPANY, OF MAINE.

MECHANICAL-TELEPHONE-LINE HANGER.

SPECIFICATION forming part of Letters Patent No. 361,302, dated April 19, 1887.

Application filed November 5, 1885. Serial No. 181,908. (No model.)

*To all whom it may concern:*

Be it known that I, GEORGE W. LORD, a citizen of the United States, and a resident of Boston, in the county of Suffolk and State of Massachusetts, have invented a new and useful Improvement in Mechanical Telephones, of which the following is a specification, reference being had to the accompanying drawings.

In an application for Letters Patent of the United States, filed July 23, 1885, I have described means for supporting the conducting-wire of a mechanical telephone, whereby I am enabled to overcome the difficulty heretofore encountered in transmitting sound on a wire having sharp turns or angles.

My present invention is an improvement upon the devices described in the said application, and relates to the means used for supporting the conducting-wire within the tube or case described in said application.

The said invention consists in inclosing tubes arranged at the points of attachment of the conducting-wire with loops extending within said tubes and serving for the suspension of said wire.

In the accompanying drawings is represented a device for carrying my invention into effect.

In the drawings, Figure 1 is a longitudinal sectional view of the tubular case and supports used for supporting the conducting-wire at an angle. Fig. 2 is a longitudinal sectional view of a straight case. Figs. 3, 4, and 5 are transverse sectional views showing different forms of the support, and Fig. 6 is a view of a line supported by the devices described.

In the several figures the same letters refer to the same parts.

Referring to the drawings, A is the tubular case, preferably made in two parts telescoped one within the other, and connected together in this manner. This case is preferably made of tin or other metal, and is either angular or straight, as represented in Figs. 1 and 3, respectively, according to the character of the line.

B represents the loop for supporting the wire C. This is preferably made of tarred hemp; but other material may be used, as may be found convenient. In Figs. 1, 2, 3, and 4 is represented one method of supporting this loop, and in Fig. 5 another and simpler method is shown. The first-named method consists in the use of two rings, $a\,a$, of iron or other suitable material, each of which bears against the flange $b\,b$, formed in the angle of the tube in its manufacture. These rings are prevented from coming together by means of a block, $c$, on the interior surface of the tube. A cord, D, of tarred hemp or other suitable substance, is wrapped around each of these rings, and part of this cord is made into a loop, B, which extends toward the center of the tube, as shown in Figs. 3 and 4, and is maintained in an open form by means of braces $e\,e$. The cord D acts to prevent contact of the ring with the tubular case. The wire C rests upon the loop without being embraced by the same, thus reducing the amount of surface in contact with the support and the consequent conduction of sound-waves.

It is obvious that a suitable loop, or several loops, may be formed from the cord within the case in other ways than those described.

In Fig. 5 is represented a simpler manner of forming the loop than that previously described. In this case the loop is of a V-shaped form, and is made by carrying the cord through perforations in the tube. The use of an angular tube for supporting the conducting-wire permits the formation of angles in the line, as represented in Fig. 6, and the construction of the tube in two parts and the manner of connecting the same permits the two parts of the tube to be turned so that the branches of the angle formed by the conducting-wire may be placed in different planes, as in some cases may be found desirable.

The tubular case not only affords a support for the loops, but also protects the wire from injury or external interference of any sort. It further incloses and protects the loops.

Having thus described my invention, what I claim, and desire to secure by Letters Patent, is—

1. A supporting and protecting tube for the conducting-wires of telephones, in combination with supporting-loops for said wires, extending within said tube and held open therein, substantially as set forth.

2. A supporting and protecting tube having sharp angles conforming to those of the conducting-wire of a telephone, in combination with supporting-loops which extend within said tube and receive said wire, said loops being held open therein, substantially as set forth.

3. The tubular case A, rings $a$, and flanges $b$, in combination with the supporting-loops within said case for the support of the wire, substantially as set forth.

4. A supporting tube or tubular case consisting of two parts, one sliding within the other, in combination with the wire-supporting loops which extend within said case, substantially as set forth.

5. The tubular case A, rings $a$, flanges $b$, and braces $e\ e$, in combination with the supporting-loops within said case for the support of the wire, substantially as set forth.

6. The combination, with the tubular case A, of rings $a$, flanges $b$, and separating-blocks $c$, substantially as set forth.

In witness whereof I have hereunto set my hand in the presence of the two subscribing witnesses.

GEORGE W. LORD.

Witnesses:
CHAS. R. TUCKER, Jr.,
ED. A. FREEMAN.